(12) United States Patent
Bhattacharjee et al.

(10) Patent No.: US 11,729,225 B2
(45) Date of Patent: Aug. 15, 2023

(54) DEVICES AND METHODS FOR UE-BASED DETECTION AND PREVENTION OF ILLEGITIMATE NETWORK CALLS

(71) Applicant: QUALCOMM Incorporated, San Diego, CA (US)

(72) Inventors: Ankur Bhattacharjee, San Diego, CA (US); Cherng-Shung Hsu, San Diego, CA (US); Subrato Kumar De, San Diego, CA (US); Mattias Kaulard Huber, Solana Beach, CA (US); Krishna Ram Budhathoki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/456,527

(22) Filed: Nov. 24, 2021

(65) Prior Publication Data
US 2023/0164198 A1    May 25, 2023

(51) Int. Cl.
*H04L 65/1076*  (2022.01)
*H04W 76/30*  (2018.01)
(Continued)

(52) U.S. Cl.
CPC ...... *H04L 65/1079* (2013.01); *H04L 65/1016* (2013.01); *H04L 65/1046* (2013.01); *H04L 65/1096* (2013.01); *H04W 76/30* (2018.02)

(58) Field of Classification Search
CPC ............. H04L 65/1079; H04L 65/1016; H04L 65/1046; H04L 65/1096; H04W 76/30
See application file for complete search history.

(56) References Cited

U.S. PATENT DOCUMENTS

2007/0150773 A1*  6/2007  Srivastava .......... H04L 65/1079
                                                           714/49
2020/0396221 A1* 12/2020  Shaffer ............... H04L 63/0892
(Continued)

OTHER PUBLICATIONS

International Search Report and Written Opinion—PCT/US2022/047250—ISA/EPO—dated Jan. 24, 2023 12 pages.

*Primary Examiner* — Charles C Jiang
*Assistant Examiner* — Shawn D Miller
(74) *Attorney, Agent, or Firm* — The Marbury Law Group

(57) ABSTRACT

Various embodiments may include methods and systems for avoiding connecting an illegitimate call within a telecommunications network. Various embodiments may include receiving, from a telecommunications network, an incoming call initiating message notifying the first wireless device of an incoming call, in which the incoming call initiating message includes caller information. Some embodiments may further include transmitting a provisional response message including callee information of the first wireless device in response to receiving the incoming call initiating message, transmitting a request message to a second wireless device based on the caller information and the callee information, determining whether the second wireless device initiated the incoming call based on a response message from the second wireless device, if received, in response to the request message, and taking an action to prevent connection of the incoming call in response to determining that the second wireless device did not initiate the incoming call.

26 Claims, 10 Drawing Sheets

(51) Int. Cl.
   *H04L 65/1096*   (2022.01)
   *H04L 65/1046*   (2022.01)
   *H04L 65/1016*   (2022.01)

(56) References Cited

U.S. PATENT DOCUMENTS

| | | | |
|---|---|---|---|
| 2021/0306452 A1 | 9/2021 | Auffret et al. | |
| 2021/0360040 A1* | 11/2021 | Abdelmalek | H04L 65/1069 |
| 2021/0360402 A1* | 11/2021 | Powers | H04L 9/3268 |
| 2022/0094548 A1* | 3/2022 | Asveren | H04L 65/1104 |

* cited by examiner

DEVICES AND METHODS FOR UE-BASED DETECTION AND PREVENTION OF ILLEGITIMATE NETWORK CALLS

BACKGROUND

Spoofed and spam calls are a major issue worldwide and are occurring excessively in smartphones implementing Long-Term Evolution (LTE)/Fifth Generation (5G) communication technologies. Telecommunications operators are enabling Voice over Long-Term Evolution (VoLTE) (and in future, Voice over New Radio (VoNR) in 5G) that utilize Internet Protocol (IP) Multimedia Subsystem (IMS) with Session Initiation Protocol (SIP) signaling in setting up the 5G VoNR, 4G VoLTE, and Voice over WiFi (VoWiFi) sessions. As an attempt to stop the problem in the USA, the Federal Communication Commission (FCC) is forcing telephony providers to implement Secure Telephone Identity Revisited (STIR) and Signature-based Handling of Asserted Information Using toKENs (SHAKEN) (i.e., STIR/SHAKEN) protocols for Caller ID Authentication in the IP portions of their networks. However, STIR/SHAKEN does not provide a complete solution in preventing spoofed calls. Further, the rest of the world, including China and India where spam calls are predominant, will not benefit from FCC-mandated STIR/SHAKEN policies.

SUMMARY

Various aspects of the present disclosure include methods and devices configured to perform the methods for avoiding connecting illegitimate telecommunications calls, including using provisional messaging to verify if a wireless device identified by caller information actually initiated a call session with a recipient wireless device.

Various aspects may include methods performed by a first wireless device including receiving, from a telecommunications network, an incoming call initiating message notifying the first wireless device of an incoming call, in which the incoming call initiating message includes caller information, transmitting a provisional response message, the provisional response message comprising callee information of the first wireless device, in response to receiving the incoming call initiating message, transmitting a request message to a second wireless device based on the caller information and the callee information, determining whether the second wireless device initiated the incoming call based on a response message from the second wireless device, if received, in response to the request message, and taking an action to prevent connection of the incoming call in response to determining that the second wireless device did not initiate the incoming call.

In some aspects, the caller information may include an Internet Protocol (IP) Multimedia Subsystem (IMS) Public User Identity (IMPU) number, a FROM tag, and a Call-ID identifier of a wireless device that initiated the incoming call to the first wireless device, and the callee information includes a TO tag.

In some aspects, transmitting the request message to the second wireless device based on the caller information and the callee information may include transmitting the request message by populating a Request uniform resource identifier (Request-URI) of the request message with the IMPU number in the FROM header or P-Asserted-Identity header, the FROM tag, the Call-ID identifier, and the TO tag.

In some aspects, transmitting the request message to the second wireless device based on the caller information and the callee information may include transmitting one of an OPTIONS request message or an UPDATE request message to the second wireless device.

In some aspects, taking an action to prevent connection of the incoming call may include transmitting an error message to the telecommunications network in response to determining that the second wireless device did not initiate the incoming call.

In some aspects, taking an action to prevent connection of the incoming call may include terminating the incoming call in response to determining that the second wireless device did not initiate the incoming call.

Some aspects may further include determining that the second wireless device did not initiate the incoming call in response to determining that no response message was received from the second wireless device.

Some aspects may further include initiating a response timer upon transmission of the request message to the second wireless device, determining that no response message was received from the second wireless device in response to the response timer expiring before receiving a response message from the second wireless device.

Various aspects may further include methods performed by a second wireless device including receiving a request message from a first wireless device including callee information generated by the first wireless device and caller information identified in an incoming call initiating message received by the first wireless device, determining, based on the caller information and the callee information, whether the second wireless device initiated a call to the first wireless device, transmitting, to the first wireless device, a response message based on whether the second wireless device initiated a call to the first wireless device.

In some aspects, determining, based on the caller information and the callee information, whether the second wireless device initiated a call to the first wireless device may include determining whether the caller information and the callee information corresponds to an active outbound call request of the second wireless device.

In some aspects, transmitting, to the first wireless device, the response message based on whether the second wireless device initiated a call to the first wireless device may include transmitting a response message that includes at least one of a rejection message or an error code.

In some aspects, the caller information includes an IMS Public User Identity (IMPU) number, a FROM tag, and a Call-ID identifier of a wireless device that initiated the call to the first wireless device, and the callee information includes a TO tag. In some aspects, the received request message is an OPTIONS request message or an UPDATE request message.

Further aspects may include a wireless device having a processor and a modem configured to perform one or more operations of any of the methods summarized above. Further aspects may include a non-transitory processor-readable storage medium having stored thereon processor-executable instructions configured to cause a processor and modem of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor and a modem configured to perform one or more operations of any of the methods summarized above

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
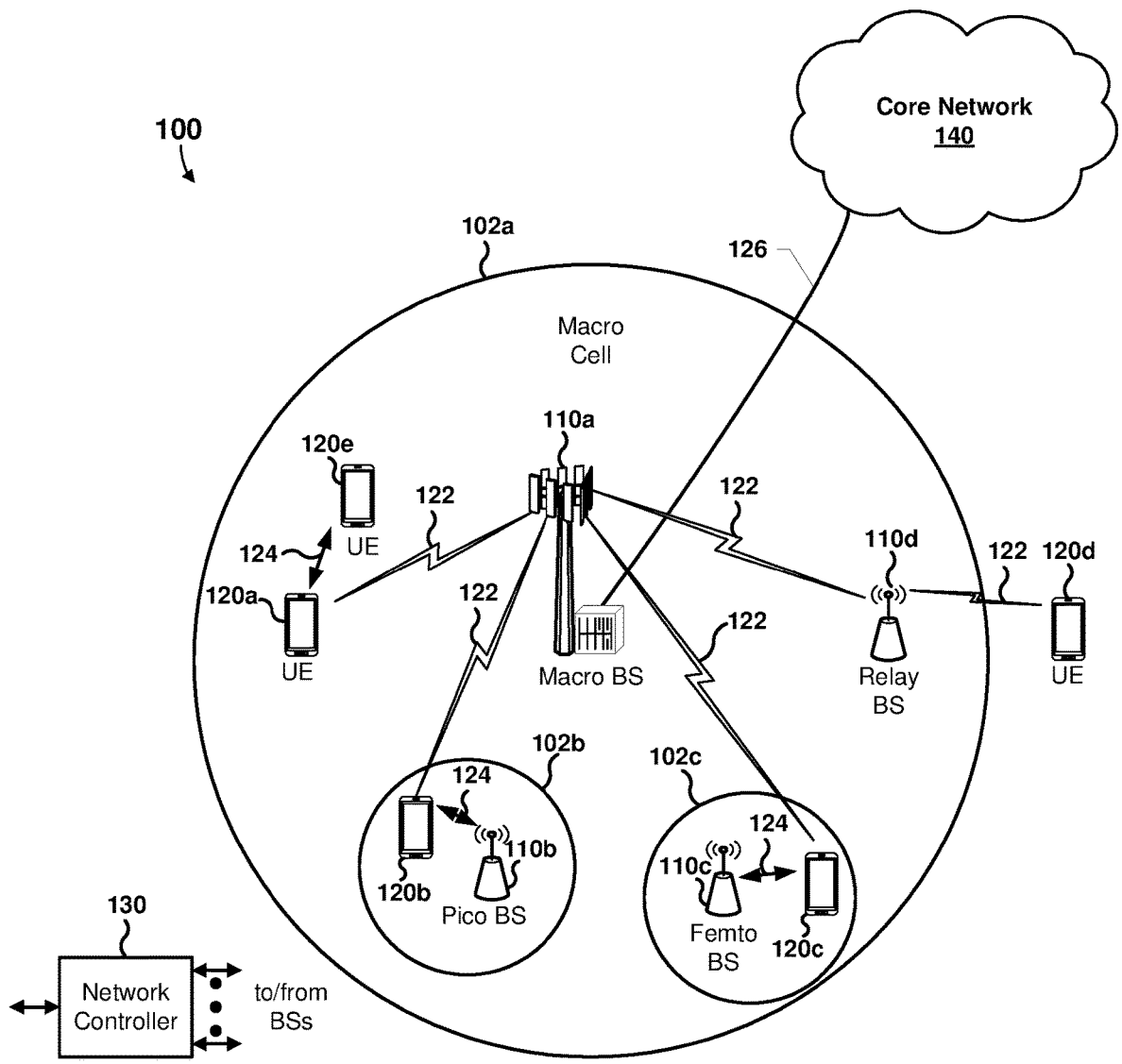
FIG. 1 is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems, methods and devices implementing the methods for user equipment (UE)-based detection and prevention of network calls in which the calling party spoofs the caller information, such as to induce a called person to answer an illegitimate call.

A wireless device may receive an incoming call initiating message, such as a Session Initiation Protocol (SIP) INVITE message, from another wireless device to attempt to establish a call session between the devices across a telecommunications network. The incoming call received by the called wireless device may include caller information, which in a SIP environment may include an Internet Protocol (IP) Multimedia Subsystem (IMS) Public User Identity (IMPU) number, a FROM tag, and an identifier of the calling device, which is referred to herein as a Call-ID identifier. The user of a wireless device receiving the incoming call initiating message (i.e., the called wireless device) may not be able to recognize whether the call is a spam call or a spoofed call based on the calling phone number in the Call-ID identifier displayed on the wireless device because this information can be falsified. Similarly, the wireless device may not be able to identify a spam call or a spoofed call when the INVITE message includes falsified identification information.

Various embodiments may utilize caller information including the IMPU number, FROM tag, and a Call-ID identifier, and callee information including a TO tag (i.e., populated by the called wireless device in a provisional response message or code (e.g., 183 Session Progress, 180 Ringing, etc.)) to generate and attempt to send a request message (e.g., SIP OPTIONS/UPDATE request message) from the called wireless device to the wireless device identified by the caller information. If a wireless device matching the caller information exists and is online, the identified wireless device may receive the request message and reply appropriately. If the calling wireless device has spoofed caller information of another wireless device that is online (sometimes referred to herein as the "victim caller" or the "spoofed wireless device"), the called wireless device will have transmitted the request message to the spoofed wireless device. In response to receiving the request message, the spoofed wireless device may determine that it did not initiate the incoming call to the called wireless device, and may transmit a response message to the called wireless device indicating that the spoofed wireless device did not initiate the incoming call. In response to receiving such a response message, the called wireless device may notify the network or terminate further transactions with the calling wireless device. On the other hand, if the calling wireless device did originate the call, and thus is a legitimate calling wireless device, the legitimate calling device may respond to the request message indicating that the call is legitimate. In response to receiving such a response message, the called wireless device may respond to the INVITE message to establish a call session with the calling wireless device. However, if a wireless device matching the caller information does not exist or is not online, then no response message will be received by the called wireless device. In response to not receiving any response to the request message, such as within a predetermined time after sending the request message, the called wireless device may treat the incoming call as illegitimate, and notify the network or terminate further transactions with the calling wireless device.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements within autonomous and semiautonomous vehicles, wireless devices affixed to or incorporated into various mobile platforms, and similar electronic devices that include a memory, multiple SIMs, wireless communication components and a programmable processor. In some standards a wireless device is referred to as "user equipment" or "UE."

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., Read-Only Memory (ROM), Random-Access Memory (RAM), Flash, etc.), and resources (e.g., timers, voltage regulators, oscillators, etc.). SOCs may also include software for controlling the integrated resources and processors, as well as for controlling peripheral devices.

The term "system-in-a-package" may be used herein to refer to a single module or package that contains multiple resources, computational units, cores and/or processors on two or more IC chips, substrates, or SOCs. For example, a system-in-a-package may include a single substrate on which multiple IC chips or semiconductor dies are stacked in a vertical configuration. Similarly, the system-in-a-package may include one or more multi-chip modules (MCMs) on which multiple ICs or semiconductor dies are packaged into a unifying substrate. A system-in-a-package may also include multiple independent SOCs coupled together via high-speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA), IEEE 802.11 (WiFi), IEEE 802.16 (WiMAX), IEEE 802.20, Flash-OFDM®, etc. Reference may be made to wireless networks that use Long Term Evolution (LTE) standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various embodiments.

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure. Implementations for 5G systems or networks are currently being adopted that provide new radio (NR) (also referred to a 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, support wireless communications, including connecting phone calls, with wireless devices in a cell. For ease of reference, the term "network device" or "network computing device" is used to refer to any of a variety of network elements that may perform operations of various embodiments, non-limiting examples of which include a base station, an eNodeB, a gNodeB, etc.

Spoofed and spam calls using falsified caller identification information have been persistent and prevalent throughout LTE/5G telecommunications networks. Certain technologies and protocols have been adopted by some telecommunications providers in an attempt to combat the increasing number of spoofed and spam calls. For example, some telecommunications providers have adopted a STIR/SHAKEN protocol (i.e., Secure Telephone Identity Revisited (STIR) and Signature-based Handling of Asserted Information Using toKENs (SHAKEN) standards). However, some telecommunications providers do not employ protocols such as the STIR/SHAKEN protocol. Regardless, deploying such protocols to uniformly detect and prevent spoofed and spam calls may pose significant challenges. Deployment worldwide would require significant re-architecture of the VoIP framework, assuming network operators agreed to enact such policies. For example, issues may arise when the originating service provider is not STIR/SHAKEN compliant and did not attach any attestation, in which case a node further along the line would have to attach additional information. This may occur when a call is spoofed through a voice service provider other than the service provider providing service to the attacker (i.e., spoofer), and therefore won't have any attestation attached, irrespective of being inside or outside a STIR/SHAKEN-compliant country. Issues may also occur when the attacker is outside of a STIR/SHAKEN-compliant telecommunications network and attempting to compromise a victim within a STIR/SHAKEN-compliant telecommunications network, since the attacker's initiating message may not have an appropriate authentication/certificate. While the U.S. is the first country to deploy STIR/SHAKEN protocols, robocalling/spoofing is a global problem and will require global adoption of such protocols to be effective. Furthermore, in some countries, a large portion of spoofed and spam calls originate from the telecommunications operators that have no incentive to address the problem by enacting STIR/SHAKEN protocols. Attaching an attestation level, such as STIR/SHAKEN protocols, to identify the authenticity of the caller may not sufficiently help ordinary consumers who may not investigate the attestation information attached to an incoming call, unless the network providers block spoofed calls for them.

Various embodiments overcome the aforementioned issues by providing a UE-based solution to detect and prevent illegitimate network calls. Various embodiments may be implemented entirely within a modem of a wireless device, independent of network-based anti-spoofing protocols, and may allow the modem of a wireless device receiving an incoming call to determine whether the call is a spoofed call without impacting existing telecommunication standards. For example, various embodiments may be implemented entirely on a UE's 5G-NR and 4G-LTE software stack. Some embodiments may be implemented within a telecommunications environment employing SIP, and the various methods for detecting and preventing illegitimate network call may be inserted within a basic SIP INVITE call flow (e.g., Request for Comment (RFC) 3261).

Various embodiments improve the performance of wireless devices and user experience using wireless devices by providing background mechanisms that will reliably identify and terminate illegitimate incoming calls while recognizing and permitting legitimate incoming call, all without requiring changes to wireless networks or network equipment.

FIG. 1 is a system block diagram illustrating an example communication system 100 suitable for implementing any of various embodiments. The communications system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless device 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short-range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

Figure 2:
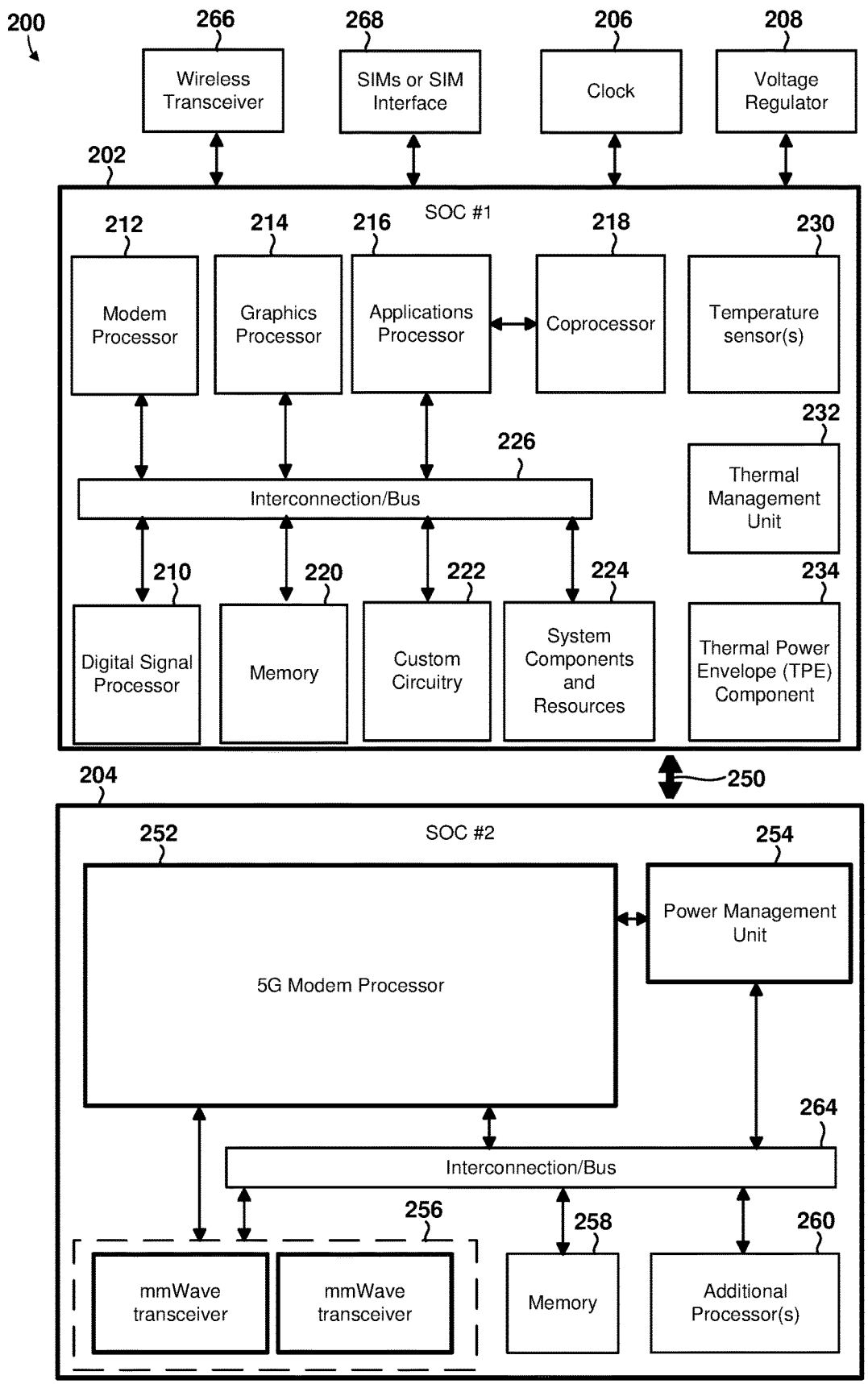
FIG. 2 is a component block diagram illustrating an example computing and wireless modem system suitable for implementing various embodiments.

FIG. 2 is a component block diagram illustrating an example computing and wireless modem system 200 suitable for implementing any of various embodiments. Various embodiments may be implemented on a number of single processor and multiprocessor computer systems, including a system-on-chip (SOC) or system in a package.

With reference to FIGS. 1 and 2, the illustrated example wireless device 200 (which may be a system-in-a-package in some embodiments) includes a two SOCs 202, 204 coupled to a clock 206, a voltage regulator 208, at least one subscriber identity module (SIM) 268 and/or a SIM interface and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example system-in-a-package 200 discussed above, various embodiments may be implemented in a wide variety of computing systems, which may include a single processor, multiple processors, multicore processors, or any combination thereof.

Figure 3:
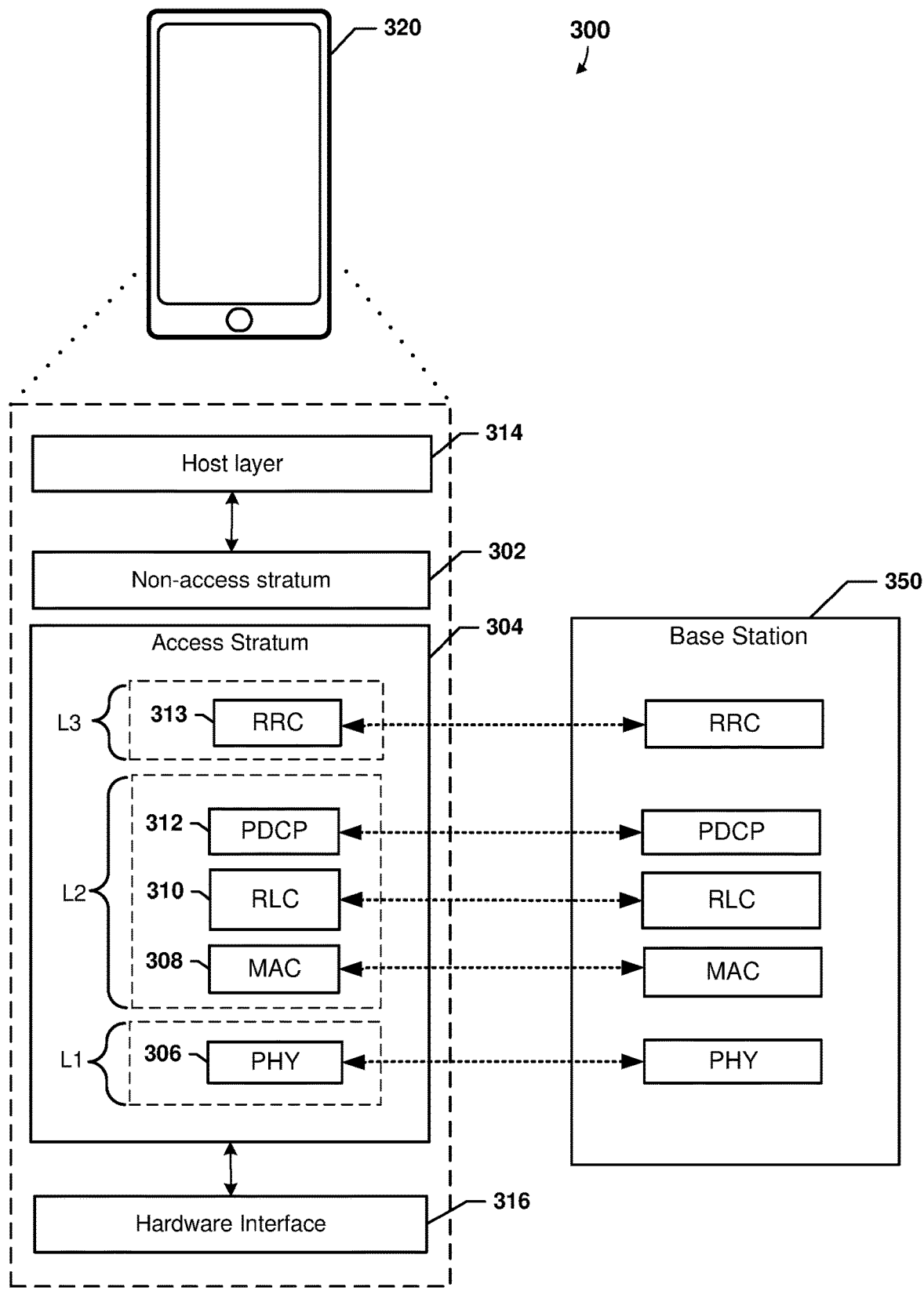
FIG. 3 is a component block diagram illustrating a software architecture including a radio protocol stack for the user and control planes in wireless communications suitable for implementing various embodiments.

FIG. 3 is a component block diagram illustrating a software architecture 300 including a radio protocol stack for the user and control planes in wireless communications suitable for implementing any of various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-d) of a communication system (e.g., 100). In some embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support Channel State Indicator (CSI) measurements and reporting (e.g., Channel Quality Indicator (CQI) measurements and reporting).

In the user and control planes, Layer 2 (L2) of the AS 304 may be responsible for the link between the wireless device 320 and the base station 350 over the physical layer 306. In various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general-purpose processor.

In other embodiments, the software architecture 300 may include one or more higher logical layers (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
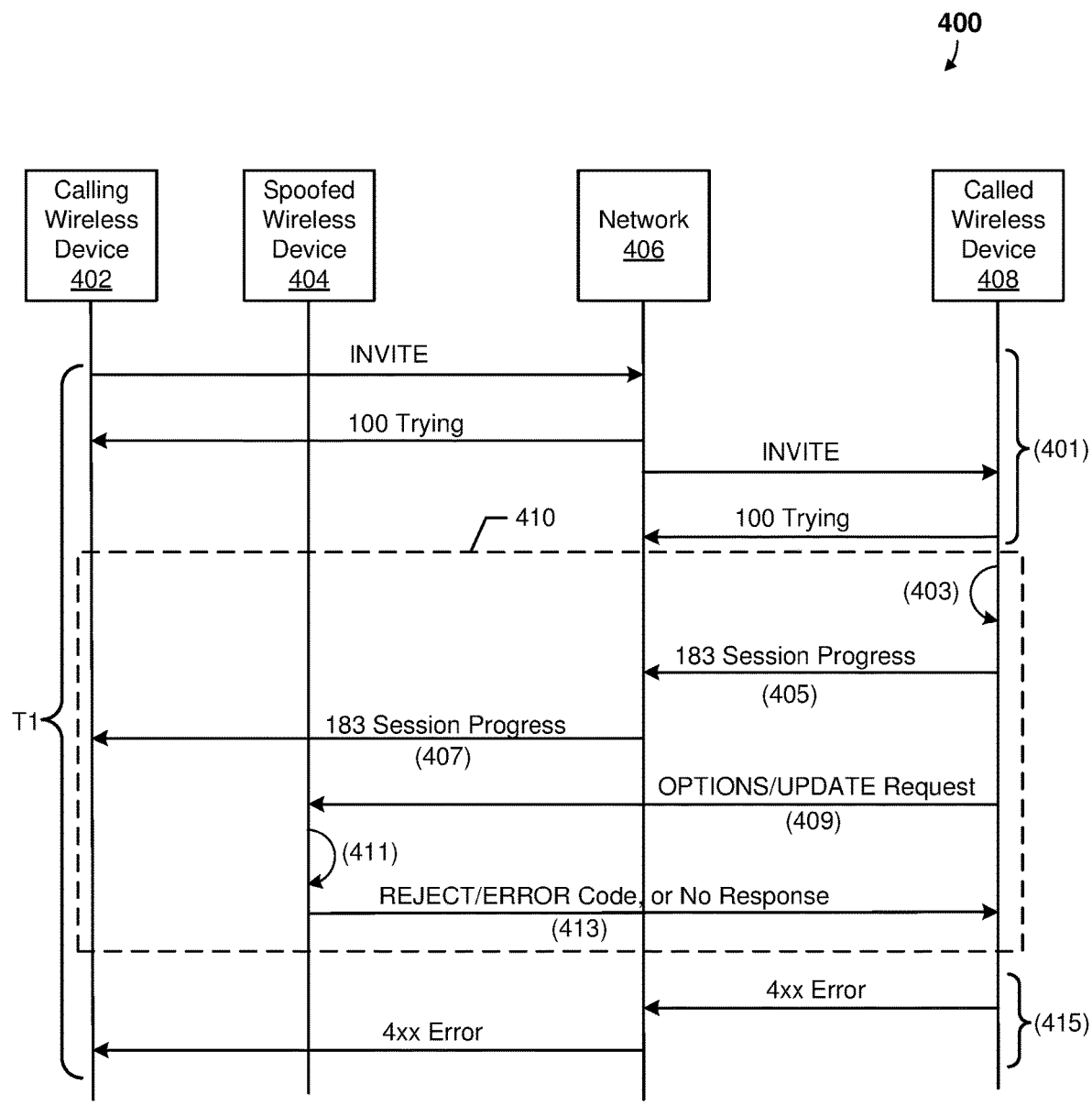
FIG. 4 is a message flow diagram illustrating message exchanges between a calling wireless device, a spoofed wireless device, a network, and a called wireless device during an illegitimate call attempt according to various embodiments.

FIG. 4 is a message flow diagram 400 illustrating message exchanges between a calling wireless device 402, a spoofed wireless device 404, a network 406 (e.g., SIP proxy), and a called wireless device 408 during an illegitimate call attempt according to various embodiments. In the illustrated example, the calling wireless device 402 (i.e., actual caller) is an attacker attempting to initiate and establish a malicious call, such as a spoofed or spam call, with the called wireless device 408 ("victim callee") using the credentials of the spoofed wireless device 404 ("victim caller"). In various embodiments, a telecommunications network protocol (e.g., SIP) may be modified to include additional protocol messages 410 for avoiding connecting an illegitimate call initiated by the calling wireless device 402. Without implementing the additional protocol messages 410, a call session between the calling wireless device 402 and the called wireless device 408 may be established by using the identification information of the spoofed wireless device 404, and a user of the called wireless device 408 may be tricked into accepting an unwanted call.

In the illustrated example, the telecommunications network implements SIP. However, the additional protocol messages 410 may be implemented in a similar manner in other various telecommunication network protocols before establishing a connection between a calling wireless device and a called wireless device. In a telecommunications network implementing SIP, the additional protocol messages 410 may be introduced into the transaction T1 before the SIP session executes 180 Ringing provisional responses. As illustrated in FIG. 4, various wireless devices may communicate with each other across a telecommunications network. However, non-wireless user equipment (e.g., landlines) may be implemented in a similar manner as the wireless devices according to various embodiments.

In the call initiation message exchanges 401, the calling wireless device 402 may attempt to establish a call session with the called wireless device 408 across the network 406. Specifically, the calling wireless device 402 may transmit an outgoing call initiating message to the called wireless device 408 via the network 406. The called wireless device 408 may receive an incoming call initiating message from the calling wireless device 402 via the network 406. The incoming call initiating message may notify the called wireless device 408 of an incoming call. In embodiments implementing SIP, the incoming call initiating message may be an INVITE message received from the network 406. A series of INVITE messages and 100 Trying messages may be communicated between the calling wireless device 402, the network 406, and the called wireless device 408 during the call initiation message exchanges 401. For example, the calling wireless device may transmit an INVITE message to the network 406. The network 406 may transmit an INVITE message to the called wireless device 408 and may transmit a 100 Trying message to the calling wireless device 402 in response to receiving the INVITE message from the calling wireless device 402. The called wireless device 408 may transmit a 100 Trying message to the network 406 in response to receiving the INVITE message from the network 406.

The incoming call initiating message may include caller information. For example, the incoming call initiating message may be a SIP INVITE message including caller information. In this example, the caller information of the spoofed wireless device 404 (i.e., victim caller) has been spoofed or illegitimately copied by the calling wireless device 402 (i.e., malicious attacker/spammer). Thus, the incoming call initiating message (e.g., INVITE message) received by the called wireless device 408 includes caller information associated with identifying the spoofed wireless device. In telecommunications networks implementing SIP, the caller information may include and IMS Public User Identity (IMPU) and/or a phone number, a FROM tag, and a Call-ID identifier of the spoofed wireless device 404. The IMPU number, FROM tag, and Call-ID identifier may be identified within the INVITE message by the called wireless device 408.

Following the call initiation message exchanges 401, additional protocol messages 410 may be implementing prior to establishing a call to avoid connecting an illegitimate call session in various embodiments.

In operation 403, the called wireless device 408 may initiate a response timer. The response timer may be for a time period (e.g., 1-3 seconds) during which the called wireless device 408 waits for a response from a wireless device identified by the caller information within the incoming call initiating message. The called wireless device 408 may, upon the expiration of the response timer, terminate further transactions of an incoming call. The response timer may be initiated after the exchanges of the call initiation message exchanges 401 are performed (e.g., after the 100 Trying message transmitted by the called wireless device 408). In some embodiments, the response timer may be initiated before the 183 session progress communication 405, at the same time as the communication 405, or after the communication 405.

In some embodiments capable of implementing 183 Session Progress messages within a SIP environment, the called wireless device 408 may transmit a provisional 183 Session Progress message to the network 406 in communication 405. In response to receiving the 183 Session Progress message from the called wireless device 408, the network 406 may transmit a 183 Session Progress message to the calling wireless device 402 in communication 407. The series of 183 Session Progress messages from the called wireless device 408 to the calling wireless device 402 may allow the establishment of an early Dialog between the calling wireless device 402 and the called wireless device 408.

The call initiation message exchanges 401 and the communications 405 and 407 together may establish an early Dialog between the calling wireless device 402 and the called wireless device 408. Based on the call initiation message exchanges 401 and the generation of the communications 405, the called wireless device may identify caller information (i.e., received from the calling wireless device 402) and may generate callee information (i.e., generated during the communication 405), which may include a TO tag. For example, the INVITE messages in the call initiation message exchanges 401 may include a FROM header that is populated by a FROM tag that is assigned by the calling wireless device 402. The INVITE messages may also include a TO header that remains unpopulated until the called wireless device 408 responds to the INVITE message via the provisional 183 Session Progress message. In response to receiving the INVITE message, the called wireless device 408 may generate a TO tag and populate the TO header of the message with the TO tag (i.e., callee information). The called wireless device may then transmit a response message, such as a provisional 183 Session Progress message that includes the FROM header populated with the FROM tag of the calling wireless device 402 and the TO header populated with the TO tag of the called wireless device 408. As a further example, if a calling wireless device transmitted multiple INVITE messages to multiple called wireless devices, the calling wireless device may receive multiple response messages, all of which include the same FROM tag but each including different and unique TO tags.

After establishing an early Dialog between the calling wireless device 402 and the called wireless device 408, the called wireless device 408 may transmit a request message to a wireless device identified by the caller information in communication 409. Thus, depending on whether the call is legitimate or not, the communication 409 may be directed to either the spoofed wireless device 404 in the event of an illegitimate call, or a wireless device that initiated the incoming call initiating message during a legitimate call. The called wireless device 408 may send the request message to a wireless device identified by the caller information to determine whether the incoming call initiated in the call initiation message exchanges 401 was initiated by the wireless device receiving the request message. In other words, the called wireless device 408 may transmit the request message to a wireless device identified by the caller information to determine whether the incoming call originated from the wireless device identified by the caller information.

In the event of an illegitimate call, the request message will be transmitted from the called wireless device 408 to the spoofed wireless device 404 based on the caller information received and identified in call initiation message exchanges 401.

In embodiments implementing SIP, the request message in communication 409 may be an OPTIONS request message or an UPDATE request message. The called wireless device 408 may generate the request message based on the caller information received in call initiation message exchanges 401. For example, the called wireless device 408 may use the phone number/IMPU obtained from the "From header" or the "P-Asserted-Identity Header" of the identified caller information, and may generate and transmit, "in-dialog", a request message by populating the Request-URI (Uniform Resource Identifier) headers with the same values of the IMPU number, FROM tag, and Call-ID identifier of the INVITE message (e.g., INVITE message received by the called wireless device 408 in the call initiation message exchanges 401). The Request-URI headers may be further populated with callee information including a TO tag that was generated as part of the provisional 183 Session Progress message in communication 505. In the case of a real attack or spam call, the SIP request message may be transmitted to the spoofed wireless device 404 whose IMPU the attacker spoofed. Thus, as illustrated in FIG. 4, the called wireless device 408 may generate and transmit a request message to the spoofed wireless device 404 based on the caller information received from the attacker calling wireless device 402, in which the calling wireless device 402 is using the spoofed caller information to pretend to be the spoofed wireless device 404. In the case of a legitimate call, the called wireless device 408 will transmit the request message to the legitimate calling wireless device based on the caller information received in an INVITE message from the legitimate calling wireless device.

The request message may include the "whole" original dialog-ID (i.e., three tuples: FROM tag, TO tag, Call-ID identifier) if necessary to prevent precluding the possibility that the incoming call is from the real identity owner (e.g., legitimate calling wireless device). Otherwise, UPDATE or OPTIONS request messages may be rejected even if the calling wireless device is the legitimate owner of the caller information. An example of a generated Request-URI included in an OPTIONS request message or an UPDATE request message that is transmitted to a spoofed wireless device or a legitimate calling wireless device may appear as follows:

Via: SIP/2.0/UDP pc33.atlanta.com; branch=z9hG4bK776asdhds
To: Bob <sip:bob@biloxi.com>; tag=16252615
From: Alice <sip:alice@atlanta.com>; tag=1928301774
Call-ID: a84b4c76e66710@pc33.atlanta.com
Contact: <sip:alice@pc33.atlanta.com>

In the Request-URI example above, the TO tag is 16252615, the FROM tag is 1928301774, and the Call-ID identifier is a84b4c76e66710. The FROM tag and Call-ID identifier values may be sourced from the incoming call initiating message (e.g., INVITE message) received by the called wireless device 408 in the call initiation message exchanges 401, the TO tag value is derived from the provisional response message (e.g., 183 Session Progress message) generated in communication 405, and TO tag, FROM tag, and Call-ID identifier may then be used to generate the request message to be sent to a wireless device designated by these values. The TO tag is generated by the called wireless device, and remains intact throughout the dialog per Request for Comments (RFC) 3261.

The FROM and TO tags are utilized along with the Call-ID identifier to make an entire dialog unique. The local tag (i.e., FROM tag) may be assigned by the sender of a message, or a User Agent Client (UAC) (i.e., UAC/attacker/caller/calling wireless device 402/legitimate calling wireless device). The remote tag (i.e., TO tag) is assigned by the final recipient of the message, or the User Agent Server (UAS) (i.e., UAS/Callee/Victim Callee/called wireless device 408). The UAC may put its tag in the FROM header and the UAS receiver may put its tag in the TO header. Thus, when a message leaves the UAC, it has one tag in the FROM header and there is no tag in the TO header. When a UAS receives that message from the UAC and responds back with a SIP response (e.g., 1xx provisional response), the UAS adds a tag to the TO header. Subsequently, all following control messages will have the same unique ID including FROM tag, TO tag, and Call-ID identifier within the dialog (i.e., within a complete exchange of SIP messages between two user-agents from Start to End).

In operation 411, the spoofed wireless device 404 may determine, based on the caller information identified in the request message received from the called wireless device 408 in communication 409, whether the spoofed wireless device 404 initiated the call to the called wireless device 408. The spoofed wireless device 404 may determine that a call session should not be established (i.e., with the attacker calling wireless device 402) and should be rejected by the called wireless device 408 if the request message (e.g., OPTIONS/UPDATE request message) received by the spoofed wireless device 404 cannot be correlated with an active outbound request of the spoofed wireless device 404. In that case, the spoofed caller's target domain/user may reject the request message because it cannot be correlated with an outbound call request for the victim whose IMPU/phone number is spoofed by the attacker.

In communication 413, the spoofed wireless device 404 may transmit a response message to the called wireless device 408 based on whether the spoofed wireless device 404 initiated the call to the called wireless device 408. In the example of an illegitimate call illustrated in FIG. 4, the spoofed wireless device 404 will determine in operation 411 that the spoofed wireless device 404 did not transmit an incoming call initiating message to the called wireless device 408, and the spoofed wireless device 404 transmit a response message in communication 413 to the called wireless device 408 indicating the call is not legitimate. The response message may include a rejection message and/or an error code indicating that the spoofed wireless device 404 did not initiate the call to the called wireless device 408. For example, the spoofed wireless device 404 may reject providing information corresponding to the OPTIONS/UPDATE request message received from the called wireless device 408, therefore indicating that the spoofed wireless device 404 has no active outbound calls related to the call received by the called device. As another example, the spoofed wireless device 404 may transmit an error code in the response message in communication 413 to the called wireless device 408, indicating that the called wireless device 408 should terminate existing and cease further transactions and communications with the calling wireless device 402. In the case of a SIP network, the spoofed wireless device 404 may transmit a 481 Call/Transaction Does Not Exist response message, or a Server received a request that does not match any dialog or transaction response message.

In some cases, an attacking calling wireless device 402 may spoof an IMPU number that does not exist or is unreachable (e.g., offline, powered off). The called wireless device 408 may therefore generate a request message using caller information (e.g., FROM tag, TO tag, Call-ID identifier) that will be transmitted across the network 406 with no real destination. With no real destination to a spoofed wireless device or a legitimate calling wireless device, the called wireless device 408 may receive no response to the transmitted request message. If no response is received in response to the request message, the called wireless device 408 may determine that the incoming call is an illegitimate call, and therefore terminate further transactions with the calling wireless device 402.

If a response message is received from a wireless device (e.g., spoofed wireless device during malicious call, or wireless device during legitimate call) within the time period of the response timer, the response timer may be ignored. If a response message is not received from a wireless device (e.g., spoofed wireless device during malicious call, or wireless device during legitimate call) within the time period, the response timer may expire and the called wireless device 408 may determine that no response was received within the response timer duration.

In some embodiments, the response timer initiated in operation 403 may expire before the called wireless device receives a response message in response to the request message transmitted in communication 409. In a situation in which the request message has no real destination (e.g., the spoofed caller information does not exist or the spoofed wireless device is offline), the expiration of the response timer may provide a cutoff time so that the called wireless device 408 does not continue to wait for a response message indefinitely. In some embodiments, a response timer may act as a further mechanism to prevent an illegitimate call. For example, spoofed or spam calls initiated by the calling wireless device 402 may take longer to provide a response than a legitimate call. For example, if an attacker somehow manages to frame a response code (e.g., SIP 2xx response code) to reply to the request message (e.g., OPTIONS request message) targeted for the original IMPU owner (e.g., spoofed wireless device 404), the called wireless device 408 is supposed to receive two responses before the local response timer expires, and a mismatch in the Via-Header signature is expected. The Via-Header identifies a call's path with the protocol name, protocol version, transport type, user agent client (UAC), the protocol port for the request, and a branch parameter which serves as a unique identifier for each SIP transaction. Thus, if the response timer expires before receiving two response messages, and/or the Via-Header signatures match, the called wireless device 408 may determine that the incoming call is an illegitimate call.

After receiving a response message in communication 413 from the spoofed wireless device 404 or not receiving a response message before the expiration of the response timer, the called wireless device 408 may determine that the calling wireless device 402 is a spoofer and may therefore perform an action to prevent connection of the incoming call in communications 415. If the response message indicates that the spoofed wireless device 404 did not initiate the incoming call, the called wireless device 408 may refrain from alerting the user of the called wireless device (e.g., a callee) and may cancel any further transactions associated with the illegitimate incoming call. In some embodiments, the communications 415 may include transmitting an error message (e.g., SIP 4xx error message) to the network 406, which may instruct the network 406 to convey the error message to the calling wireless device 402. In some embodiments, the communications 415 may include terminating the incoming call initiated by the calling wireless device 402 locally on the called wireless device 408.

Figure 5:
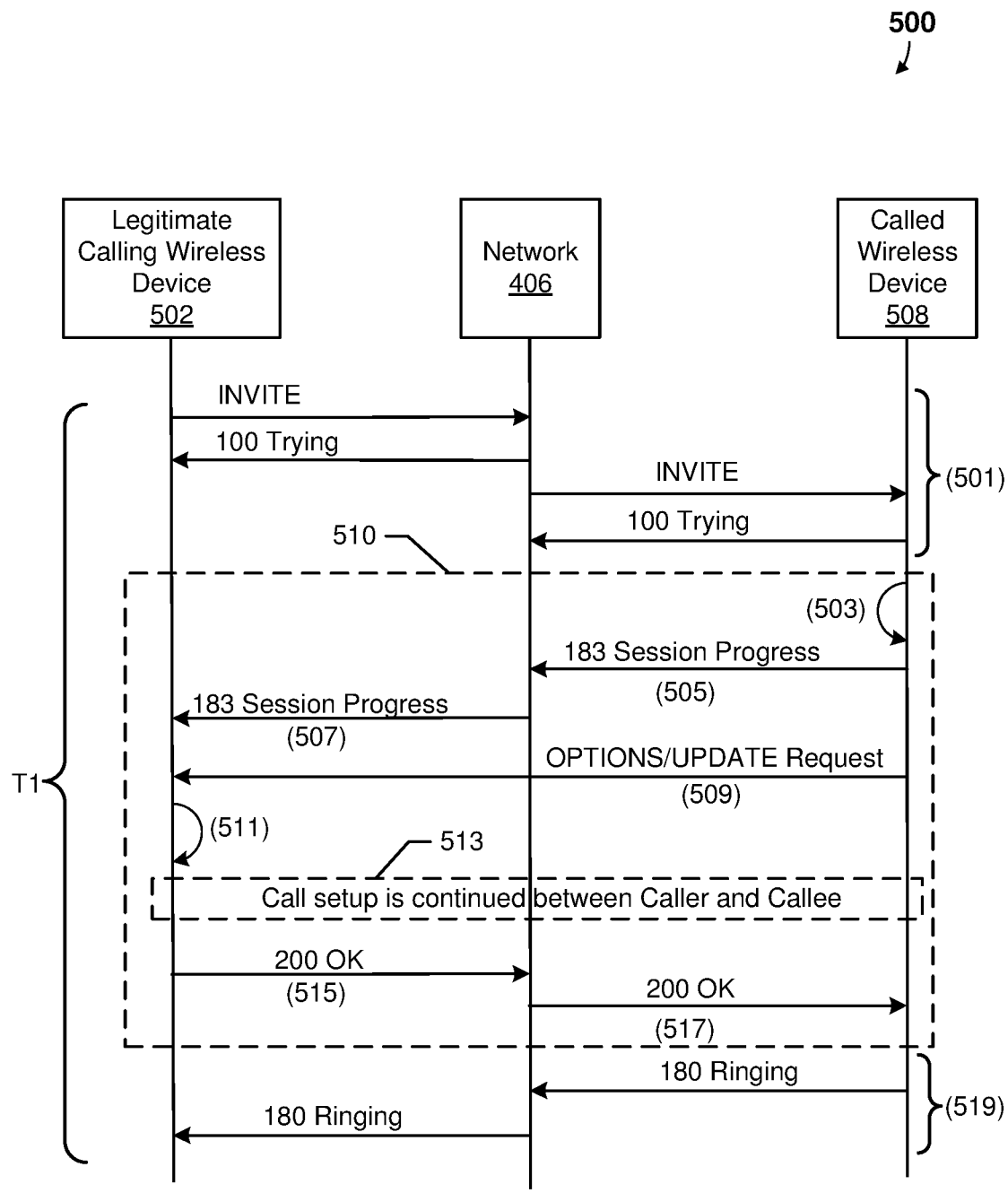
FIG. 5 is a message flow diagram illustrating message exchanges between a legitimate calling wireless device, a network, and a called wireless device during a legitimate call attempt according to various embodiments.

FIG. 5 is a message flow diagram 500 illustrating message exchanges between a legitimate calling wireless device 502, a network 406 (e.g., SIP proxy), and a called wireless device 408 during a legitimate call attempt according to various embodiments. In contrast to the embodiments as described with reference to FIG. 4 illustrating an illegitimate call attempt, FIG. 5 illustrates processes in which a response message is received from a legitimate calling wireless device 502. The legitimate calling wireless device 502 (i.e., actual and legitimate caller) may be attempting to initiate and establish a legitimate call with the called wireless device 408. The example illustrated in FIG. 5, is for a communications network implementing SIP. However, the additional protocol messages 510 may be implemented in a similar manner in other various telecommunication network protocols before establishing a connection between a legitimate calling wireless device and a called wireless device. As illustrated in FIG. 5, various wireless devices may communicate with each other across a telecommunications network. In a telecommunications network implementing SIP, the additional protocol messages 510 may be introduced into the transaction T1 before the SIP session executes 180 Ringing provisional responses. However, non-wireless user equipment (e.g., landlines) may be implemented in a similar manner as the wireless devices according to the embodiments.

In call initiation message exchanges 501, the legitimate calling wireless device 502 may attempt to establish a call session with the called wireless device 408 across the network 406 including the messages of the message flow diagram 400 described with reference to FIG. 4. Further, the operations 503 and communications 505, 507 and 509 may be performed as described for like number operations and communications in the message flow diagram 400 described with reference to FIG. 4. For example, transmitting a request message in communication 509 may be performed in a similar manner as transmitting a request message to a wireless device identified in the caller information obtained from the INVITE message as described for communication 409.

In response to receiving the request message in communication 509, the legitimate calling wireless device 502 may determine whether the legitimate calling wireless device 502 initiated a call to the called wireless device 408 in operation 511. In some embodiments, the legitimate calling wireless device 502 may make this determination based on the caller information (e.g., IMPU number, FROM tag, and Call-ID identifier) identified in the request message (e.g., OPTIONS/UPDATE request message) received from the called wireless device 408 in communication 509, and based on the callee information (e.g., TO tag) generated as part of the response message (e.g., 183 Session Progress) in communication 505. The legitimate calling wireless device 502 may determine that a call session should be established and should be accepted by the called wireless device 408 if the request message (e.g., OPTIONS/UPDATE request message) received by the legitimate calling wireless device 502 can be correlated with an active outbound request of the legitimate calling wireless device 502. Therefore, the legitimate caller's target domain/user may accept and reply to the request message since it can be correlated with an outbound call request (e.g., call initiation message exchanges 501).

In some embodiments, the legitimate calling wireless device 502 may determine whether the legitimate calling wireless device 502 initiated a call to the called wireless device 408 by correlating the request message with an active outbound call session request based at least on the TO tag in the TO header of the request message. For example, the legitimate calling wireless device 502 may have received, and subsequently stored, a TO tag populated by the called wireless device 408 as part of the provisional response message (e.g., 183 Session Progress) in communications 505 and 507. After receiving the request message in communication 509, the legitimate calling wireless device 502 may compare a TO tag populated in the TO header of the Request-URI of the request message with the stored TO tag received in communication 507. A match of the stored TO tag and TO tag received as part of the request message may indicate that the legitimate calling wireless device 502 did initiate the call session in the call initiation message exchanges 501. Assuming the situation as described with reference to FIG. 4 in which the calling wireless device 402 is an illegitimate calling device, the spoofed wireless device 404 may have never received the provisional response message (i.e., illegitimate calling wireless device 402 received the provisional response message). Thus, the spoofed wireless device 404 may not have previously received and stored a TO tag of the called wireless device 408, and may therefore not be able to compare a stored TO tag with the TO tag received as part of the request message in communication 509. An inability to associate the TO tag received as part of the request message in communication 509 with an active outbound request may indicate that the spoofed wireless device 404 did not initiate the incoming call initiating message.

In response to the legitimate calling wireless device 502 determining that the request message received from the called wireless device 508 is associated with an active outbound call request, the legitimate calling wireless device 502 and the called wireless device 408 may continue to perform Call Setup operations across the network 406 in communications 513. Thus, when the caller is valid and the caller responds as per the utilized specifications (e.g., Session Description Protocol (SDP)) and/or per the action(s) requested in the original request message of communication 509, call setup may continue.

After performing a call setup between the legitimate calling wireless device 502 and the called wireless device 408, the legitimate calling wireless device 502 may transmit a notification message indicating that the request of the request message was successful. In some embodiments capable of implementing 183 Session Progress messages within a SIP environment, the legitimate calling wireless device 502 may transmit a 200 OK message to the network 406 in communication 515. In response to receiving the 200 OK message from the legitimate calling wireless device 502, the network 406 may transmit a 200 OK message to the called wireless device 408 in communication 517. The series of 200 OK messages from the legitimate calling wireless device 502 to the called wireless device 408 may notify the called wireless device 408 to continue to establish the call according to the conventional procedures (e.g., 180 Ringing to alert user of established call).

In response to determining that the legitimate calling wireless device 502 initiated the incoming call as indicated by the notification message (e.g., 200 OK messages), the called wireless device 408 may signal the network 406 to accept the incoming call initiated in the call initiation message exchanges 501. For example, in messages 519, the called wireless device 408 may transmit a 180 Ringing message to the network 406, and the network 406 may transmit a corresponding 180 Ringing message to the legitimate calling wireless device 502.

Figure 6:
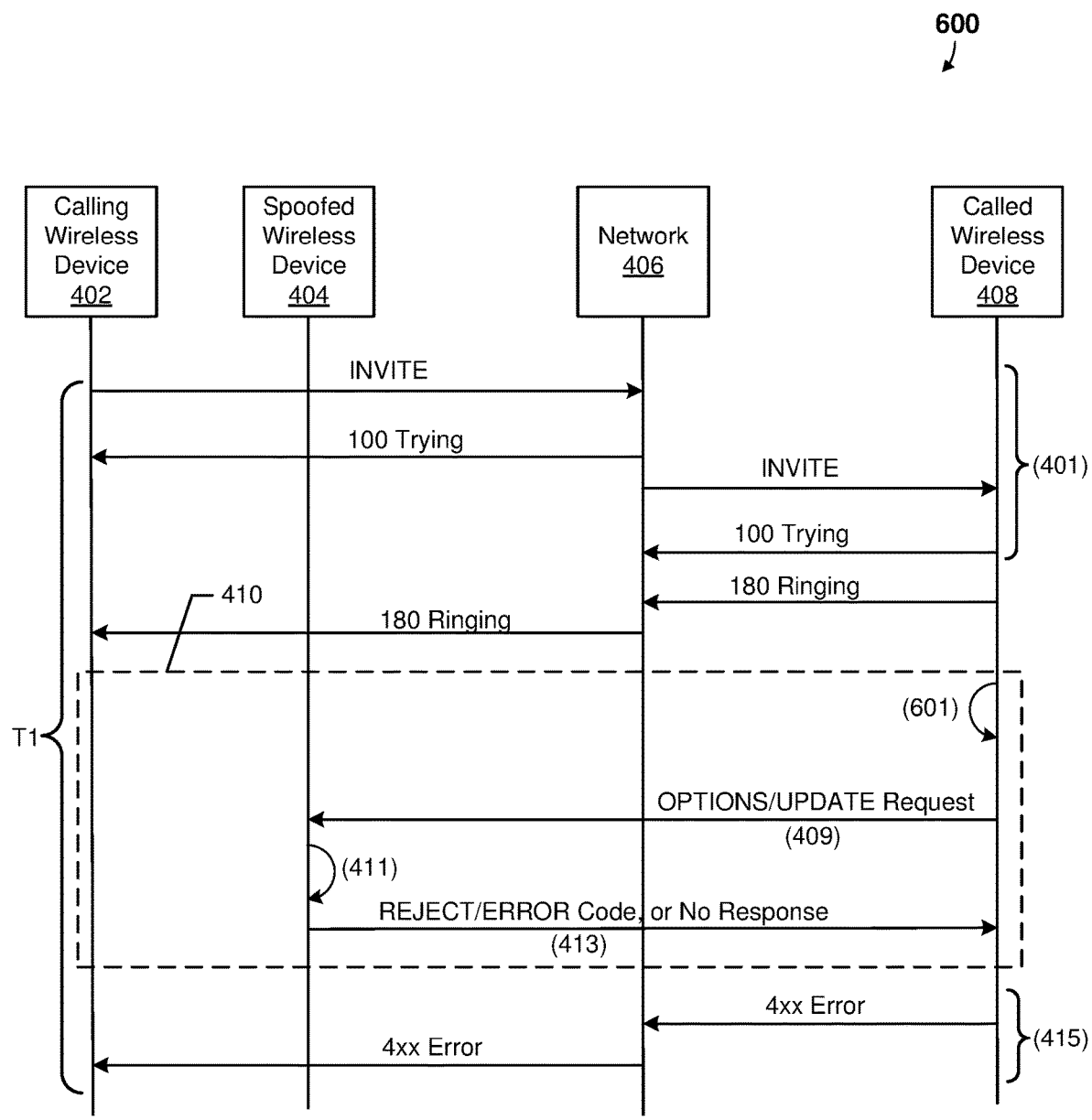
FIG. 6 is a message flow diagram illustrating message exchanges between a calling wireless device, a spoofed wireless device, a network, and a called wireless device during an illegitimate call attempt within a legacy system according to various embodiments.

FIG. 6 is a message flow diagram 600 illustrating message exchanges between a calling wireless device 402, a spoofed wireless device 404, a network 406 (e.g., SIP proxy), and a called wireless device 408 during an illegitimate call attempt within a legacy system according to various embodiments. The calling wireless device 402 (i.e., actual caller) may be an attacker attempting to initiate and establish a malicious call, such as a spoofed or spam call, with the called wireless device 408 (i.e., victim callee) using the credentials of the spoofed wireless device 404 (i.e., victim caller).

In contrast to the embodiments as described with reference to FIG. 4 illustrating an illegitimate call attempt, FIG. 6 illustrates processes that may be performed in a similar manner as described above, in which the calling wireless device 402 initiates telecommunications processes using legacy protocols. For example, the calling wireless device 402 may transmit an incoming call initiating message (e.g., call initiation message exchanges 401) using a legacy SIP version that cannot implement 183 Session Progress messages. The called wireless device 408 may receive the legacy incoming call initiating message and determine that it should revert to implementing legacy protocols. In response to receiving the legacy INVITE message, the called wireless device 408 may transmit a provisional 180 Ringing message to the network 406, and in turn, cause the network 406 to transmit a provisional 180 Ringing message to the calling wireless device 402 according to conventional legacy SIP protocols. As part of generating and transmitting the 180 Ringing message in response to the INVITE message, the called wireless device 408 may populate a TO header of the 180 Ringing message with a TO tag in a similar manner as populating a TO header in a 183 Session Progress message with a TO tag as described with reference to FIGS. 4 and 5.

After transmitting the provisional 180 Ringing message to the network 406, the called wireless device 408 may initiate a delay timer in operation 601. The delay timer may be a time period, such as 1 to 2 seconds. Upon the expiration of the delay timer, the user of the called wireless device 408 may be alerted of the incoming call, instead of alerting the user of the incoming call immediately after transmitting the provisional 180 Ringing message. During the duration of the timer, the communication 409, operation 411, and communication 413 may be performed as described with reference to FIG. 4 to determine if the incoming call initiating message is correlated to an active outbound call request of the spoofed wireless device 404. Thus, the delay timer delays alerting the victim callee until a response message (e.g., rejection message/error code in communication 413) for the request message (e.g., OPTIONS/UPDATE request message in communication 409) is received or the delay timer expires, instead of alerting the callee immediately after the 180 Ringing message is transmitted.

In some embodiments as described with reference to FIGS. 1-6, the called wireless device 408 may record and maintain a database of all the decisions made on the incoming calls and may update the user (e.g., callee) intermittently with a summary of its decisions. For example, the callee UE, or called wireless device 408, may maintain a database including the callee's contacts' phone numbers in the callee's address book mapped to the latest IP-address associated with each phone number. Such a database may be referred to as an "Address-Book Phone Number to IP address Map." The Address-Book Phone Number to IP address Map may be updated at any time (e.g., wireless device battery being charged, lying idle at night, user option to manually trigger the update, etc.) using the following steps: (i) callee UE transmits SIP OPTIONS requests to all contacts from the callee's address book, then (ii) update the "Address-Book Phone Number to IP address Map" with the latest IP address in the SIP OPTIONS Response to the previous OPTIONS request. Thus, when a mobile terminated (MT) call (e.g., VoLTENoNR/VoWIFI) is received by a potential victim callee UE (e.g., called wireless device 408), the UE may check the originator IP address extracted from the SIP INVITE message with the entry in the table "Address-Book Phone Number to IP address Map." If there is any difference in the originating caller IP address with the IP Address stored in the "Address-Book Phone Number to IP address Map," it may indicate a possible Caller ID Spoofing, and the processes described with reference to any of FIGS. 4-6 may be invoked. If there is no difference in the originating caller IP address with the IP Address stored in the "Address-Book Phone Number to IP address Map," the processes described with reference to any of FIGS. 4-6 may not need to be invoked, as it indicates that the incoming MT call is not a spoofed call, and a call session may be established immediately.

Figure 7:
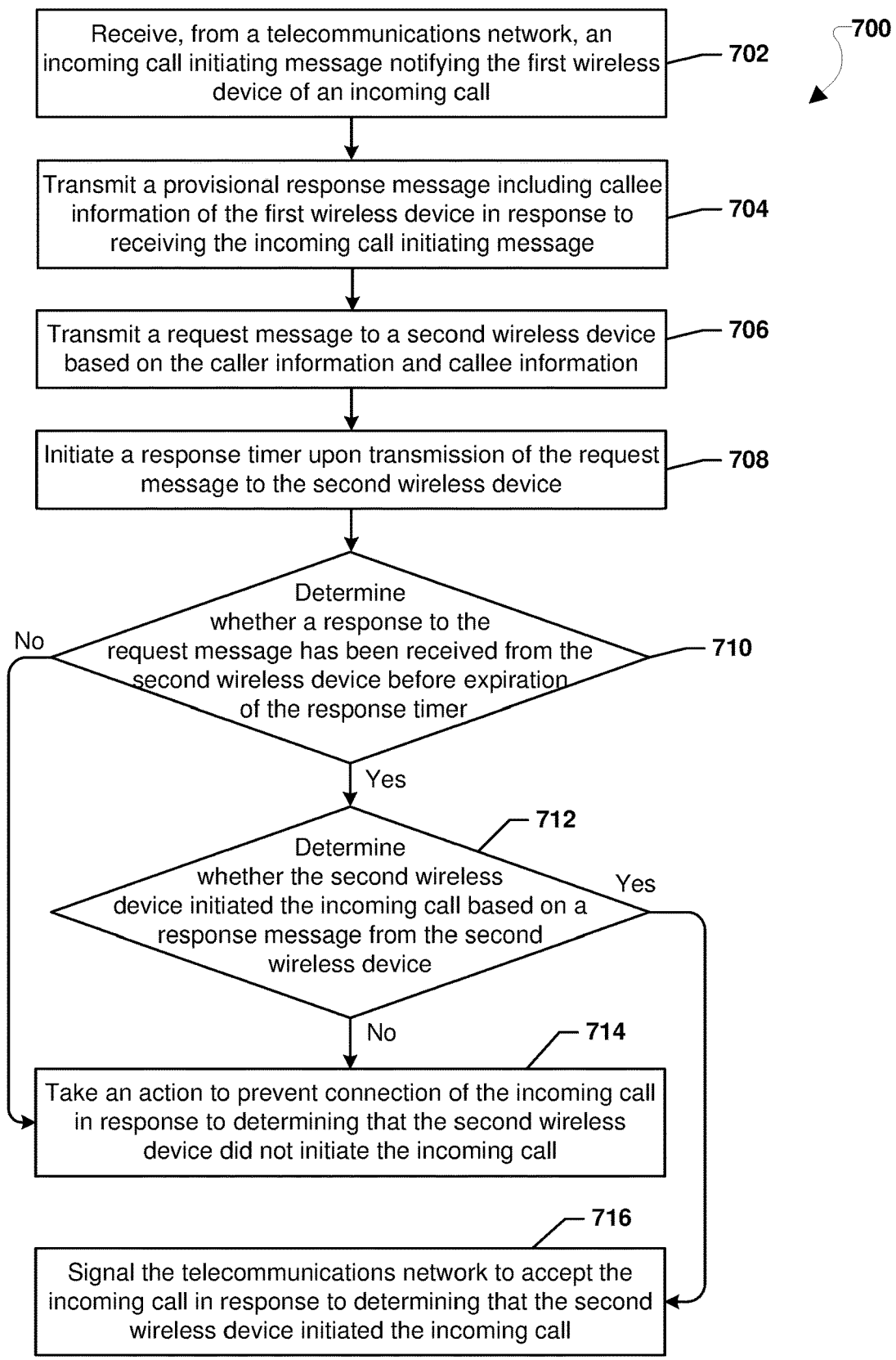
FIG. 7 is a process flow diagram illustrating an embodiment method for avoiding connecting an illegitimate call according to various embodiments.

FIG. 7 is a process flow diagram illustrating an embodiment method 700 for avoiding connecting an illegitimate call according to various embodiments. With reference to FIGS. 1-7, the method 700 may be implemented in a processor (e.g., processors 212, 214, 216, 218, 252, 260) configured to perform operations of the method. In some embodiments, the processor (e.g., processors 212, 214, 216, 218, 252, 260) may be configured to perform the operations by processor-executable instruction stored in a non-transitory processor-readable medium (e.g., memory devices 220, 258). Means for performing each of the operations of the method 700 may be a processor of the called wireless device 408, such as the processors 212, 214, 216, 218, 252, 260, and/or the like.

In block 702, a first wireless device may receive, from a telecommunications network, an incoming call initiating message notifying the first wireless device of an incoming call, in which the incoming call initiating message may include caller information. For example, the first wireless device (e.g., called wireless device 408) may receive, from a telecommunications network (e.g., core network 140, network 406), an incoming call initiating message (e.g., INVITE message) notifying the first wireless device of an incoming call. The incoming initiating call message may be generated and transmitted by a second wireless device (e.g., calling wireless device 402, or legitimate calling wireless device 502) to the first wireless device via the telecommunications network. The caller information may include an IMPU number, a FROM tag, and a Call-ID identifier of a wireless device (e.g., spoofed wireless device 404, or legitimate calling wireless device 502) that initiated or is purported to have initiated the incoming call to the first wireless device. In some embodiments, the caller information may be fabricated and may not be correlated with an existing or online wireless device. The processes in block 702 may be performed as described with reference to FIGS. 4-6 (e.g., call initiation message exchanges 401, 501). Means for performing the operations in block 702 may include a processor of the called wireless device 408, such as the processors 212, 214, 216, 218, 252, 260, and/or the like.

In block 704, the first wireless device may transmit a provisional response message, the provisional response message including callee information of the first wireless device, in response to receiving the incoming call initiating message. For example, the first wireless device (e.g., called wireless device 408) may generate and transmit a provisional response message, such as a SIP 183 Session Progress or 180 Ringing message, to a wireless device identified by the caller information (e.g., calling wireless device 402, or legitimate calling wireless device 502) in response to the first wireless device receiving the incoming call initiating message (e.g., INVITE message) in block 702. In some embodiments, generating and transmitting the provisional response message by the first wireless device may include generating callee information including a TO tag. The provisional response message may be transmitted across a telecommunications network (e.g., core network 140, network 406) to a wireless device that transmitted the incoming call initiating message. The processes in block 704 may be performed as described with reference to FIGS. 4-6 (e.g., communications 405, 505, 180 Ringing). Means for performing the operations in block 704 may include a processor of the called wireless device 408, such as the processors 212, 214, 216, 218, 252, 260, and/or the like.

In block 706, a request message may be transmitted from the first wireless device to a second wireless device based on the caller information and the callee information. The first wireless device (e.g., called wireless device 408) may generate and transmit a request message to the second wireless device (e.g., spoofed wireless device 404, legitimate calling wireless device 502). In some embodiments, transmitting a request message to a second wireless device based on the caller information and callee information may include transmitting one of an OPTIONS request message or an UPDATE request message to the second wireless device. In a SIP environment, the Request-URI may be populated using an IMPU number, a FROM tag, and Call-ID identifier identified in the INVITE message (i.e., incoming call initiating message) received by the first wireless device as described with reference to block 702. A TO header of the Request-URI of the request message may be further populated with a TO tag generated as part of a provisional response message (e.g., 183 Session Progress, 180 Ringing) as described with reference to block 704. The processes in block 706 may be performed as described with reference to FIGS. 4-6 (e.g., communications 409, 509). Means for performing the operations in block 706 may include a processor of the called wireless device 408, such as the processors 212, 214, 216, 218, 252, 260, and/or the like.

In block 708, the first wireless device may initiate a response timer upon transmission of the request message to the second wireless device. For example, the first wireless device (e.g., called wireless device 408) may initiate a response timer (e.g., 1-3 seconds) during or after the transmission of the request message to the second wireless device (e.g., spoofed wireless device 404, legitimate calling wireless device 502). In some embodiments, the response timer may be initiated prior to the transmission of the request message (e.g., after transmitting a 100 Trying SIP message). The processes in block 708 may be performed as described with reference to FIGS. 4-6 (e.g., operations 403, 503, and 601). Means for performing the operations in block 708 may include a processor of the called wireless device 408, such as the processors 212, 214, 216, 218, 252, 260, and/or the like.

In determination block 710, the first wireless device may determine whether a response to the request message has been received from the second wireless device before expiration of the response timer. For example, the first wireless device (e.g., called wireless device 408) may determine whether a response to the request message (e.g., OPTIONS/UPDATE request message) has been received from the second wireless device (e.g., spoofed wireless device 404, legitimate calling wireless device 502) before expiration of the response timer (e.g., 1-3 seconds). The processes in determination block 710 may be performed as described with reference to FIGS. 4-6. Means for performing the operations in determination block 710 may include a processor of the called wireless device 408, such as the processors 212, 214, 216, 218, 252, 260, and/or the like.

In response to determining that a response to the request message has not been received from the second wireless device before expiration of the response timer (i.e., determination block 710="No"), the first wireless device (e.g., called wireless device 408) may take an action to prevent connection of the incoming call in block 714. In response to receiving no response prior to expiration of the response timer, the first wireless device may determine: (i) that the second wireless device (e.g., spoofed wireless device 404) has been spoofed, or (ii) the wireless device associated with the caller information is offline or does not exist. Under either scenario, lacking a received response message may indicate that the incoming call is a spoofed or spam call, and the first wireless device may determine that the second wireless device did not initiate the incoming call. In other words, the first wireless device may determine that it should take an action to prevent connection of the incoming call in response to determining that the second wireless device did not initiate the incoming call, may determine that the second wireless device did not initiate the incoming call in response to determining that no response message was received from the second wireless device, and may determine that no response message was received from the second wireless device in response to the response timer expiring before receiving a response message from the second wireless device. In some embodiments, taking an action to prevent connection of the incoming call in block 714 may include transmitting an error message to the telecommunications network (e.g., core network 140, network 406) in response to determining that the second wireless device did not initiate the incoming call, and/or terminating the incoming call in response to determining that the second wireless device did not initiate the incoming call. The processes in block 714 may be performed as described with reference to FIGS. 4-6. Means for performing the operations in block 714 may include a processor of the called wireless device 408, such as the processors 212, 214, 216, 218, 252, 260, and/or the like.

In response to determining that a response to the request message has been received from the second wireless device before expiration of the response timer (i.e., determination block 710="Yes"), the first wireless device (e.g., called wireless device 408) may determine whether the second wireless device (e.g., spoofed wireless device 404, legitimate calling wireless device 502) initiated the incoming call based on the response message from the second wireless device in determination block 712. In some embodiments, the response message may include a rejection of the request message and/or an error code indicating that the second wireless device does not have an active outbound call associated with the incoming call initiating message previously received by the first wireless device, therefore indicating that the second wireless device (e.g., spoofed wireless device 404) did not initiate the call to the first wireless device. In some embodiments, the response message may include a legitimate reply to the request message (e.g., OPTIONS/UPDATE request message), indicating that the second wireless device (e.g., legitimate calling wireless device 502) did initiate the incoming call to the first wireless device. The processes in determination block 712 may be performed as described with reference to FIGS. 4-6 (e.g., communication 413, communications 513). Means for performing the operations in determination block 712 may include a processor of the called wireless device 408, such as the processors 212, 214, 216, 218, 252, 260, and/or the like.

In response to determining that the second wireless device did not initiate the incoming call based on a response message from the second wireless device (i.e., determination block 712="No"), the first wireless device (e.g., called wireless device 408) may take an action to prevent connection of the incoming call in block 714. In response to receiving a response message including a rejection message and/or error code from the second wireless device, the first wireless device may determine that the second wireless device has been spoofed and that transactions with the wireless device that initiated the incoming call should be terminated. In some embodiments, taking an action to prevent connection of the incoming call may include transmitting an error message to the telecommunications network (e.g., core network 140, network 406) in response to determining that the second wireless device did not initiate the incoming call, and/or terminating the incoming call in response to determining that the second wireless device did not initiate the incoming call. The processes in block 714 may be performed as described with reference to FIGS. 4 and 6. Means for performing the operations in block 714 may include a processor of the called wireless device 408, such as the processors 212, 214, 216, 218, 252, 260, and/or the like.

In response to determining that the second wireless device initiated the incoming call based on a response message from the second wireless device (i.e., determination block 712="Yes"), the first wireless device (e.g., called wireless device 408) may signal the telecommunications network (e.g., core network 140, network 406) to accept the incoming call in response to determining that the second wireless device (e.g., legitimate calling wireless device 502) initiated the incoming call in block 716. The processes in block 716 may be performed as described with reference to FIG. 5. Means for performing the operations in block 716 may include a processor of the called wireless device 408, such as the processors 212, 214, 216, 218, 252, 260, and/or the like.

The order of operations performed in blocks 702-716 is merely illustrative, and the operations of blocks 702-716 may be performed in any order and partially simultaneously in some embodiments. In some embodiments, the method 700 may be performed by a processor of a device independently from, but in conjunction with, an external memory device. For example, the method 700 may be implemented as a software module executing within a processor of an SoC or in dedicated hardware within an SoC that issues commands to establish secure memory channels and access memory of an external memory device and is otherwise configured to take actions and store data as described.

Figure 8:
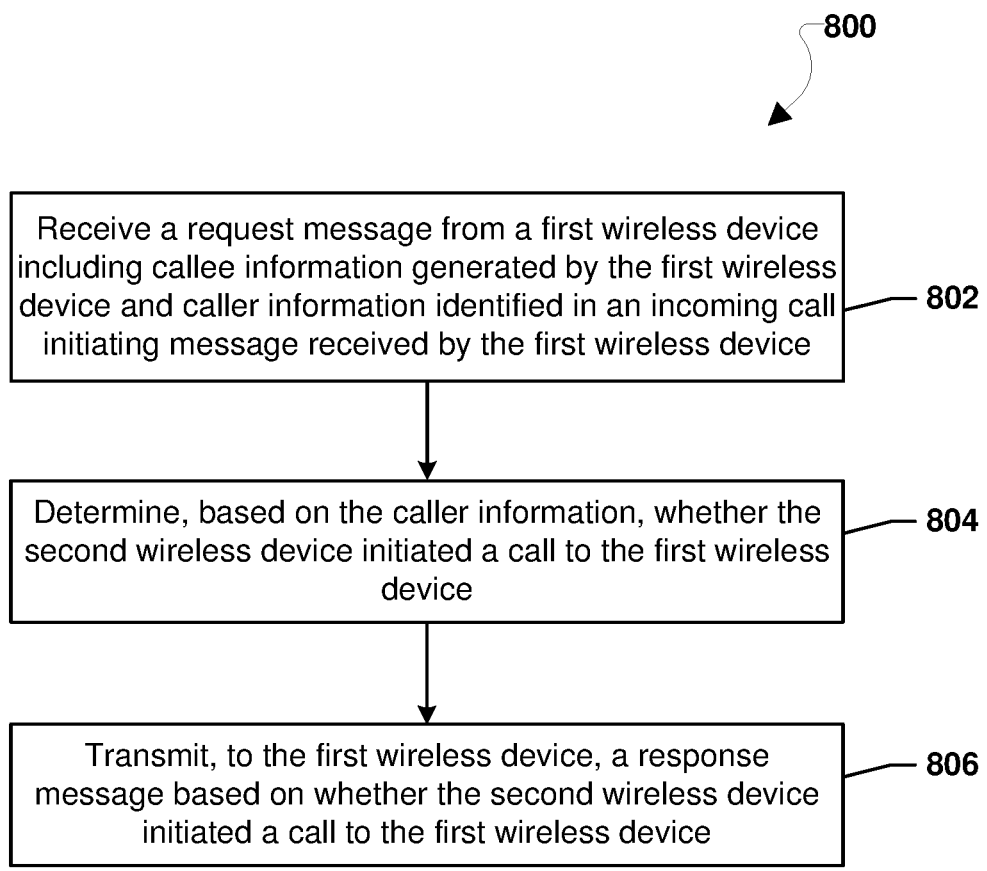
FIG. 8 is a process flow diagram illustrating an embodiment method for avoiding connecting an illegitimate call according to various embodiments.

FIG. 8 is a process flow diagram illustrating an embodiment method 800 for avoiding connecting an illegitimate call according to various embodiments. With reference to FIGS. 1-8, the method 800 may be implemented in a processor (e.g., processors 212, 214, 216, 218, 252, 260) configured to perform operations of the method. In some embodiments, the processor (e.g., processors 212, 214, 216, 218, 252, 260) may be configured to perform the operations by processor-executable instruction stored in a non-transitory processor-readable medium (e.g., memory devices 220, 258). Means for performing each of the operations of the method 800 may be a processor of the spoofed wireless device 404 or the legitimate calling wireless device 502, such as the processors 212, 214, 216, 218, 252, 260, and/or the like.

In block 802, a second wireless device (e.g., spoofed wireless device 404, legitimate calling wireless device 502) may receive a request message from a first wireless device (e.g., 408) including caller information identified in an incoming call initiating message received by the first wireless device and callee information generated by the first wireless device (i.e., in response to the first wireless device receiving an incoming call initiating message). For example, the second wireless device may receive a request message (e.g., OPTIONS/UPDATE request message) from the first wireless device (e.g., called wireless device 408), in which the request message may include (i) caller information identified by the first wireless device in an incoming call initiating message (e.g., INVITE message) that was previously received by the first wireless device, and (ii) callee information generated by the first wireless device in response to the first wireless device receiving an incoming call initiating message from another wireless device (e.g., spoofed wireless device 404, legitimate calling wireless device 502). The request message may enable the second wireless device to determine whether the second wireless device initiated a call to the first wireless device. In some embodiments, the caller information may include an IMPU number, a FROM tag, and a Call-ID identifier of a wireless device (e.g., spoofed wireless device 404, or legitimate calling wireless device 502) that initiated or is purported to have initiated the incoming call to the first wireless device. In some embodiments, the callee information may include a TO tag that was generated by the first wireless device to populate a TO header of a provisional response message (e.g., 183 Session Progress, 180 Ringing). In some embodiments, the request message may be one of an OPTIONS request message or an UPDATE request message to the second wireless device. The processes in block 802 may be performed as described with reference to FIGS. 4-6 (e.g., communications 409 and 509). Means for performing the operations in block 802 may include a processor of the spoofed wireless device 404 or the legitimate calling wireless device 502, such as the processors 212, 214, 216, 218, 252, 260, and/or the like.

In block 804, the second wireless device may use the caller information and the callee information to determine whether the second wireless device initiated a call to the first wireless device. For example, the second wireless device (e.g., 404, 502), based on the caller information and callee information received in the request message from the first wireless device (e.g., 408), may determine whether the second wireless device initiated an incoming call initiating message (e.g., INVITE message) to the first wireless device. In some embodiments, determining whether the second wireless device initiated a call to the first wireless device may include determining whether the caller information and the callee information corresponds to an active outbound call request of the second wireless device. In some embodiments, determining whether the second wireless device initiated a call to the first wireless device may include determining whether a TO tag received as part of the request message matches a stored TO tag (if any is stored at all) previously received as part of a provisional response message from the first wireless device. The processes in block 804 may be performed as described with reference to FIGS. 4-6 (e.g., operations 411, 511). Means for performing the operations in block 804 may include a processor of the spoofed wireless device 404 or the legitimate calling wireless device 502, such as the processors 212, 214, 216, 218, 252, 260, and/or the like.

In block 806, the second wireless device (e.g., 404, 502) may transmit a response message to the first wireless device (e.g., 408) in which the type of message transmitted is based on whether the second wireless device initiated a call to the first wireless device. In some embodiments, the second wireless device (e.g., a spoofed wireless device 404) may have determined that the second wireless device did not initiate a call to the first wireless device, and may then transmit a response message to the first wireless device that may include a rejection of the request message and/or an error code indicating that the second wireless device does not have an active outbound call associated with the incoming call initiating message previously received by the first wireless device. In some embodiments, the second wireless device (e.g., legitimate calling wireless device 502) may have determined that the second wireless device did initiate a call to the first wireless device, and may then transmit a response message to the first wireless device that may include a legitimate reply to the request message (e.g., OPTIONS/UPDATE request message) indicating that the second wireless device (e.g., legitimate calling wireless device 502) did initiate the incoming call to the first wireless device. The processes in block 806 may be performed as described with reference to FIGS. 4-6 (e.g., communication 413, communications 513). Means for performing the operations in block 806 may include a processor of the spoofed wireless device 404 or the legitimate calling wireless device 502, such as the processors 212, 214, 216, 218, 252, 260, and/or the like.

The order of operations performed in blocks 802-806 is illustrative, and the operations of blocks 802-806 may be performed in any order and partially simultaneously in some embodiments. In some embodiments, the method 800 may be performed by a processor of a device independently from, but in conjunction with, an external memory device. For example, the method 800 may be implemented as a software module executing within a processor of an SoC or in dedicated hardware within an SoC that issues commands to establish secure memory channels and access memory of an external memory device and is otherwise configured to take actions and store data as described.

Figure 9:
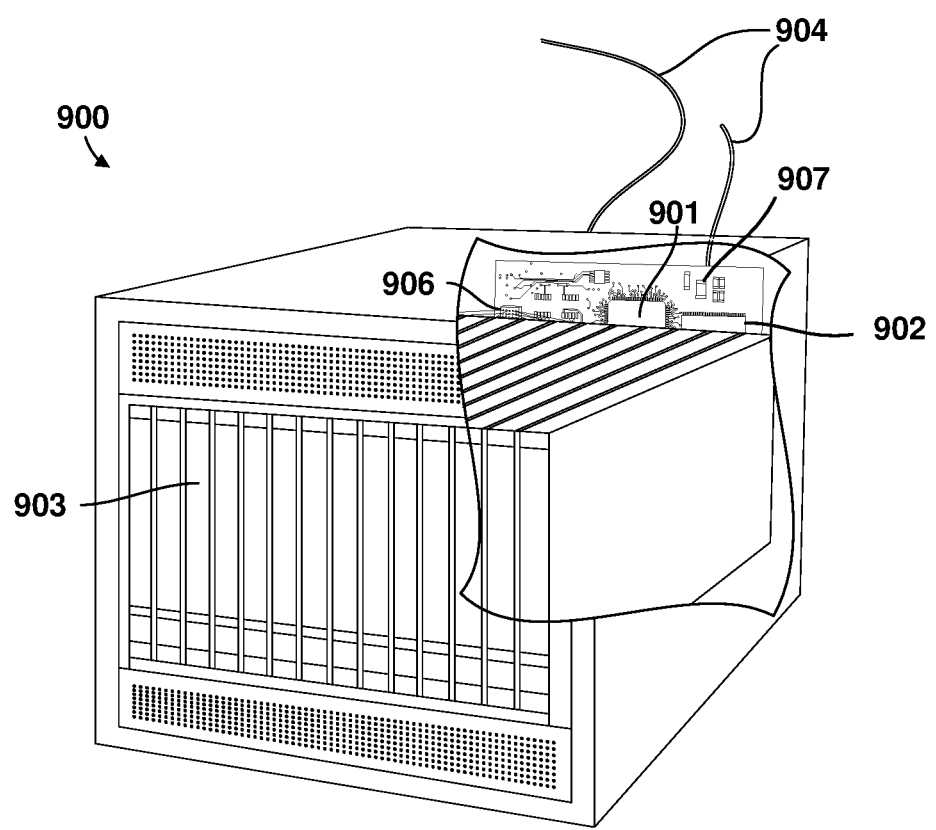
FIG. 9 is a component block diagram of a network computing device suitable for use with various embodiments.

FIG. 9 is a component block diagram of a network computing device 900, such as a base station (e.g., base station 110a-d, 350), suitable for use with various embodiments. Such network computing devices (e.g., base stations, such as gNBs, eNBs, etc.) may include at least the components illustrated in FIG. 9. With reference to FIGS. 1-9, the network computing device 900 may include a processor 901 coupled to volatile memory 902 and a large capacity non-volatile memory, such as a disk drive 903.

The network computing device 900 may also include a peripheral memory access device such as a floppy disc drive, compact disc (CD) or digital video disc (DVD) drive 906 coupled to the processor 901. The network computing device 900 may also include network access ports 904 (or interfaces) coupled to the processor 901 for establishing data connections with a network, such as the Internet and/or a local area network coupled to other system computers and servers.

The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
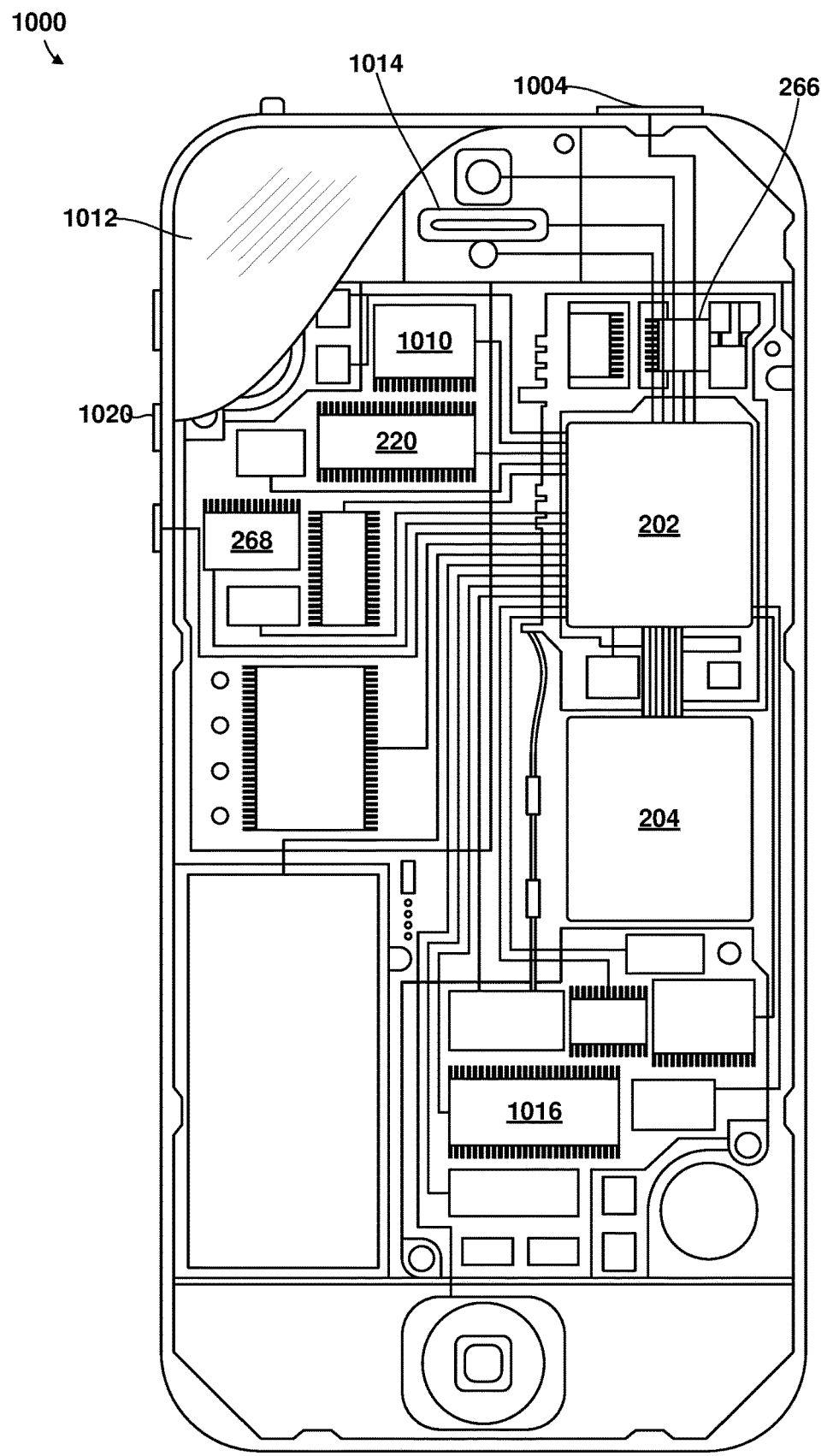
FIG. 10 is a component block diagram of a wireless device suitable for use with various embodiments.

FIG. 10 is a component block diagram of a wireless device 1000 suitable for use with various embodiments. With reference to FIGS. 1-10, various embodiments may be implemented on a variety of wireless devices 1000 (e.g., the wireless device 120a-120e, 200, 320, 402, 404, 408, 502), an example of which is illustrated in FIG. 10 in the form of a smartphone. The wireless device 1000 may include a first SOC 202 (e.g., a SOC-CPU) coupled to a second SOC 204 (e.g., a 5G capable SOC). The first and second SOCs 202, 204 may be coupled to internal memory 1016, a display 1012, and to a speaker 1014. The first and second SOCs 202, 204 may also be coupled to at least one SIM 268 and/or a SIM interface that may store information supporting a first 5GNR subscription and a second 5GNR subscription, which support service on a 5G non-standalone (NSA) network.

The wireless device 1000 may include an antenna 1004 for sending and receiving electromagnetic radiation that may be connected to a wireless transceiver 266 coupled to one or more processors in the first and/or second SOCs 202, 204. The wireless device 1000 may also include menu selection buttons or rocker switches 1020 for receiving user inputs.

The wireless device 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1010 may include a digital signal processor (DSP) circuit (not shown separately).

The processors of the wireless network computing device 900 and the wireless device 1000 may be any programmable microprocessor, microcomputer or multiple processor chip or chips that can be configured by software instructions (applications) to perform a variety of functions, including the functions of various embodiments described below. In some mobile devices, multiple processors may be provided, such as one processor within an SOC 204 dedicated to wireless communication functions and one processor within an SOC 202 dedicated to running other applications. Software applications may be stored in the memory 220, 1016 before they are accessed and loaded into the processor. The processors may include internal memory sufficient to store the application software instructions.

Implementation examples are described in the following paragraphs. While the following implementation examples are described in terms of example methods, further example implementations may include: the example methods discussed in the following paragraphs implemented in wireless devices, the example methods discussed in the following paragraphs implemented in a wireless device having a processor configured with processor-executable instructions to perform operations of the example methods; the example methods discussed in the following paragraphs implemented in a wireless device including means for performing functions of the example methods; and the methods discussed in the following paragraphs implemented in a non-transitory processor-readable storage medium having stored thereon processor-executable instructions configured to cause a processor of a wireless device to perform the operations of the example methods.

Example 1. A method performed by a processor of a first wireless device for avoiding connecting a call with spoofed caller information, including receiving, from a telecommunications network, an incoming call initiating message notifying the first wireless device of an incoming call, in which the incoming call initiating message includes caller information, transmitting a provisional response message, the provisional response message including callee information of the first wireless device, in response to receiving the incoming call initiating message, transmitting a request message to a second wireless device based on the caller information and the callee information, determining whether the second wireless device initiated the incoming call based on a response message from the second wireless device, if received, in response to the request message, and taking an action to prevent connection of the incoming call in response to determining that the second wireless device did not initiate the incoming call.

Example 2. The method of example 1, in which the caller information includes an IMS Public User Identity (IMPU) number, a FROM tag, and a Call-ID identifier of a wireless device that initiated the incoming call to the first wireless device, and the callee information includes a TO tag.

Example 3. The method of example 2, in which transmitting the request message to the second wireless device based on the caller information and the callee information includes transmitting the request message by populating a Request uniform resource identifier (Request-URI) of the request message with the IMPU number in the FROM header or P-Asserted-Identity header, the FROM tag, the Call-ID identifier, and the TO tag.

Example 4. The method of any of examples 1-3, in which transmitting the request message to the second wireless device based on the caller information and the callee information includes transmitting one of an OPTIONS request message or an UPDATE request message to the second wireless device.

Example 5. The method of any of examples 1-4, in which taking an action to prevent connection of the incoming call includes transmitting an error message to the telecommunications network in response to determining that the second wireless device did not initiate the incoming call.

Example 6. The method of any of examples 1-5, in which taking an action to prevent connection of the incoming call includes terminating the incoming call in response to determining that the second wireless device did not initiate the incoming call.

Example 7. The method of any of examples 1-6, further including determining that the second wireless device did not initiate the incoming call in response to determining that no response message was received from the second wireless device.

Example 8. The method of any of examples 1-7, further including initiating a response timer upon transmission of the request message to the second wireless device, and determining that no response message was received from the second wireless device in response to the response timer expiring before receiving a response message from the second wireless device.

Example 9. A method performed by a processor of a second wireless device, including receiving a request message from a first wireless device including callee information generated by the first wireless device and caller information identified in an incoming call initiating message received by the first wireless device, determining, based on the caller information and the callee information, whether the second wireless device initiated a call to the first wireless device, and transmitting, to the first wireless device, a response message based on whether the second wireless device initiated a call to the first wireless device.

Example 10. The method of example 9, in which determining, based on the caller information and the callee information, whether the second wireless device initiated a call to the first wireless device includes determining whether the caller information and the callee information corresponds to an active outbound call request of the second wireless device.

Example 11. The method of any of examples 9-10, in which transmitting, to the first wireless device, the response message based on whether the second wireless device initiated a call to the first wireless device includes transmitting a response message that includes at least one of a rejection message or an error code.

Example 12. The method of any of examples 9-11, in which the caller information includes an IMS Public User Identity (IMPU) number, a FROM tag, and a Call-ID identifier of a wireless device that initiated the call to the first wireless device, and the callee information includes a TO tag.

Example 13. The method of any of examples 9-12, in which the received request message is an OPTIONS request message or an UPDATE request message.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a first wireless device for avoiding connecting a call with spoofed caller information, comprising:
   receiving, from a telecommunications network, an incoming call initiating message notifying the first wireless device of an incoming call, wherein the incoming call initiating message includes caller information;
   transmitting a provisional response message, the provisional response message comprising callee information of the first wireless device, in response to receiving the incoming call initiating message;
   transmitting a request message to a second wireless device based on the caller information and the callee information, wherein the request message configured to cause the second wireless device to compare a TO tag populated in a TO header of a Request uniform resource identifier (Request-URI) of the request message with a stored TO tag;
   determining whether the second wireless device initiated the incoming call based on a response message from the second wireless device, if received, in response to the request message; and
   taking an action to prevent connection of the incoming call in response to determining that the second wireless device did not initiate the incoming call.

2. The method of claim 1, wherein the caller information includes an Internet Protocol (IP) Multimedia Subsystem (IMS) Public User Identity (IMPU) number, a FROM tag, and a Call-ID identifier of a wireless device that initiated the incoming call to the first wireless device, and the callee information includes the TO tag.

3. The method of claim 2, wherein transmitting the request message to the second wireless device based on the caller information and the callee information comprises transmitting the request message by populating the Request-URI of the request message with the IMPU number in the FROM header or P-Asserted-Identity header, the FROM tag, the Call-ID identifier, and the TO tag.

4. The method of claim 1, wherein transmitting the request message to the second wireless device based on the caller information and the callee information comprises transmitting one of an OPTIONS request message or an UPDATE request message to the second wireless device.

5. The method of claim 1, wherein taking an action to prevent connection of the incoming call comprises:
transmitting an error message to the telecommunications network in response to determining that the second wireless device did not initiate the incoming call.

6. The method of claim 1, wherein taking an action to prevent connection of the incoming call comprises:
terminating the incoming call in response to determining that the second wireless device did not initiate the incoming call.

7. The method of claim 1, further comprising:
determining that the second wireless device did not initiate the incoming call in response to determining that no response message was received from the second wireless device.

8. The method of claim 7, further comprising:
initiating a response timer upon transmission of the request message to the second wireless device; and
determining that no response message was received from the second wireless device in response to the response timer expiring before receiving a response message from the second wireless device.

9. A method performed by a processor of a second wireless device, comprising:
receiving a request message from a first wireless device including callee information generated by the first wireless device and caller information identified in an incoming call initiating message received by the first wireless device;
comparing a TO tag populated in a TO header of a Request uniform resource identifier (Request-URI) of the request message with a stored TO tag to determine, based on the caller information and the callee information, whether the second wireless device initiated a call to the first wireless device; and
transmitting, to the first wireless device, a response message based on whether the second wireless device initiated a call to the first wireless device.

10. The method of claim 9, wherein determining, based on the caller information and the callee information, whether the second wireless device initiated a call to the first wireless device comprises:
determining whether the caller information and the callee information corresponds to an active outbound call request of the second wireless device.

11. The method of claim 9, wherein transmitting, to the first wireless device, the response message based on whether the second wireless device initiated a call to the first wireless device comprises transmitting a response message that includes at least one of a rejection message or an error code.

12. The method of claim 9, wherein the caller information includes an IMS Public User Identity (IMPU) number, a FROM tag, and a Call-ID identifier of a wireless device that initiated the call to the first wireless device, and the callee information includes the TO tag.

13. The method of claim 9, wherein the received request message is an OPTIONS request message or an UPDATE request message.

14. A wireless device, comprising:
a processor configured with processor executable instructions to:
receive, from a telecommunications network, an incoming call initiating message notifying the wireless device of an incoming call, wherein the incoming call initiating message includes caller information;
transmit a provisional response message, the provisional response message comprising callee information of the wireless device, in response to receiving the incoming call initiating message;
transmit a request message to another wireless device based on the caller information and the callee information, wherein the request message is configured to cause the second wireless device to compare a TO tag populated in a TO header of a Request uniform resource identifier (Request-URI) of the request message with a stored TO tag;
determine whether the other wireless device initiated the incoming call based on a response message from the other wireless device, if received, in response to the request message; and
take an action to prevent connection of the incoming call in response to determining that the other wireless device did not initiate the incoming call.

15. The wireless device of claim 14, wherein the caller information includes an Internet Protocol (IP) Multimedia Subsystem (IMS) Public User Identity (IMPU) number, a FROM tag, and a Call-ID identifier of a wireless device that initiated the incoming call to the wireless device, and the callee information includes the TO tag.

16. The wireless device of claim 15, wherein the processor is configured with processor-executable instructions to transmit the request message by populating the Request-URI of the request message with the IMPU number in the FROM header or P-Asserted-Identity header, the FROM tag, the Call-ID identifier, and the TO tag.

17. The wireless device of claim 14, wherein the processor is configured with processor-executable instructions to transmit the request message to the other wireless device based on the caller information comprises by transmitting one of an OPTIONS request message or an UPDATE request message to the other wireless device.

18. The wireless device of claim 14, wherein the processor is further configured with processor-executable instructions to transmit an error message to the telecommunications network in response to determining that the other wireless device did not initiate the incoming call.

19. The wireless device of claim 14, wherein the processor is further configured with processor-executable instructions to terminate the incoming call in response to determining that the other wireless device did not initiate the incoming call.

20. The wireless device of claim 14, wherein the processor is further configured with processor-executable instructions to determine that the other wireless device did not initiate the incoming call in response to determining that no response message was received from the other wireless device.

21. The wireless device of claim 20, wherein the processor is further configured with processor-executable instructions to:
   initiate a response timer upon transmission of the request message to the other wireless device; and
   determine that no response message was received from the other wireless device in response to the response timer expiring before receiving a response message from the other wireless device.

22. A wireless device, comprising:
   a processor configured with processor executable instructions to:
      receive a request message from another wireless device including callee information generated by the other wireless device and caller information identified in an incoming call initiating message received by the other wireless device;
      comparing a TO tag populated in a TO header of a Request uniform resource identifier (Request-URI) of the request message with a stored TO tag to determine, based on the caller information and the callee information, whether the wireless device initiated a call to the other wireless device; and
      transmit, to the other wireless device, a response message based on whether the wireless device initiated a call to the other wireless device.

23. The wireless device of claim 22, wherein the processor is configured with processor-executable instructions to determine whether the wireless device initiated a call to the other wireless device by determining whether the caller information and the callee information corresponds to an active outbound call request of the wireless device.

24. The wireless device of claim 22, wherein the processor is further configured with processor-executable instructions to transmit a response message that includes at least one of a rejection message or an error code.

25. The wireless device of claim 22, wherein the caller information includes an IMS Public User Identity (IMPU) number, a FROM tag, and a Call-ID identifier of a wireless device that initiated the call to the other wireless device, and the callee information includes the TO tag.

26. The wireless device of claim 22, wherein the received request message is an OPTIONS request message or an UPDATE request message.

* * * * *